(12) United States Patent
Belz et al.

(10) Patent No.: US 7,914,852 B2
(45) Date of Patent: Mar. 29, 2011

(54) HIGH TEMPERATURE COATING TECHNIQUES FOR AMORPHOUS FLUOROPOLYMERS

(75) Inventors: Mathias Belz, Sarasota, FL (US); Guoming Guan, Sarasota, FL (US)

(73) Assignee: World Precision Instruments, Inc., Sarasota, FL (US)

( * ) Notice: Subject to any disclaimer, the term of this patent is extended or adjusted under 35 U.S.C. 154(b) by 543 days.

(21) Appl. No.: 12/002,980

(22) Filed: Dec. 19, 2007

(65) Prior Publication Data
US 2008/0175989 A1    Jul. 24, 2008

Related U.S. Application Data

(60) Provisional application No. 60/885,658, filed on Jan. 19, 2007.

(51) Int. Cl.
*B05D 3/02* (2006.01)

(52) U.S. Cl. ............ 427/379; 427/384; 427/385.5; 427/389.7

(58) Field of Classification Search .............. None
See application file for complete search history.

(56) References Cited

U.S. PATENT DOCUMENTS

| | | | |
|---|---|---|---|
| 5,184,192 A | 2/1993 | Gilby et al. | |
| 5,267,341 A | 11/1993 | Shearin | |
| 5,356,668 A * | 10/1994 | Paton et al. | 427/2.25 |
| 5,416,879 A | 5/1995 | Liu | |
| 5,444,807 A | 8/1995 | Liu | |
| 5,512,750 A | 4/1996 | Yanka et al. | |
| 5,604,587 A | 2/1997 | Che et al. | |
| 5,608,517 A | 3/1997 | Munk | |
| 5,882,773 A | 3/1999 | Chow et al. | |
| 6,104,485 A | 8/2000 | Wang et al. | |
| 6,156,389 A | 12/2000 | Brown et al. | |
| 6,163,641 A | 12/2000 | Eastgate | |
| 6,188,813 B1 | 2/2001 | Dourdeville et al. | |
| 6,199,257 B1 | 3/2001 | Munk et al. | |
| 6,248,823 B1 * | 6/2001 | Hrivnak et al. | 524/462 |
| 6,332,049 B1 | 12/2001 | Dasgupta | |
| 6,342,948 B1 | 1/2002 | Gilby | |
| 6,385,380 B1 | 5/2002 | Friedrich et al. | |
| 6,432,363 B2 | 8/2002 | Biebernik et al. | |
| 6,447,919 B1 | 9/2002 | Brown et al. | |
| 6,507,688 B1 | 1/2003 | Nath | |
| 6,542,231 B1 | 4/2003 | Garrett | |
| 6,603,556 B2 | 8/2003 | Belz et al. | |
| 6,632,401 B1 | 10/2003 | Wulf | |
| 6,653,148 B2 * | 11/2003 | Trapp et al. | 436/172 |
| 6,678,051 B2 | 1/2004 | Gerner et al. | |
| 6,716,391 B1 | 4/2004 | Olson | |

(Continued)

OTHER PUBLICATIONS

Mancini et al, Proceedings of SPIE, vol. 4562, pp. 593-599, 2002.*

(Continued)

*Primary Examiner* — Erma Cameron
(74) *Attorney, Agent, or Firm* — Alix, Yale & Ristas, LLP

(57) ABSTRACT

A coating technique for amorphous fluoropolymer involves adding amorphous fluoropolymer resin to a solvent. The resin solvent mixture is heated to a predetermined temperature above room temperature. The amorphous fluoropolymer resin is dissolved in a heated solvent, and the liquid coating solution is applied to a substrate. The solvent is then removed from the applied liquid coating solution. The coating technique may be employed in connection with liquid core waveguides.

9 Claims, 1 Drawing Sheet

U.S. PATENT DOCUMENTS

| | | | |
|---|---|---|---|
| 6,734,961 B2 | 5/2004 | Gerner et al. | |
| 6,800,176 B1* | 10/2004 | Birchenall | 162/164.1 |
| 6,813,427 B1 | 11/2004 | Kaltenbacher et al. | |
| 6,878,943 B2 | 4/2005 | Tao et al. | |
| 2002/0018633 A1* | 2/2002 | Imaizumi | 385/132 |
| 2004/0000231 A1* | 1/2004 | Bikson et al. | 95/45 |
| 2004/0115823 A1* | 6/2004 | Potyrailo | 436/124 |
| 2005/0131527 A1 | 6/2005 | Pathak | |

OTHER PUBLICATIONS

Datta et al, IEEE Sensors Journal, 3(6), pp. 788-795, 2003.*

* cited by examiner

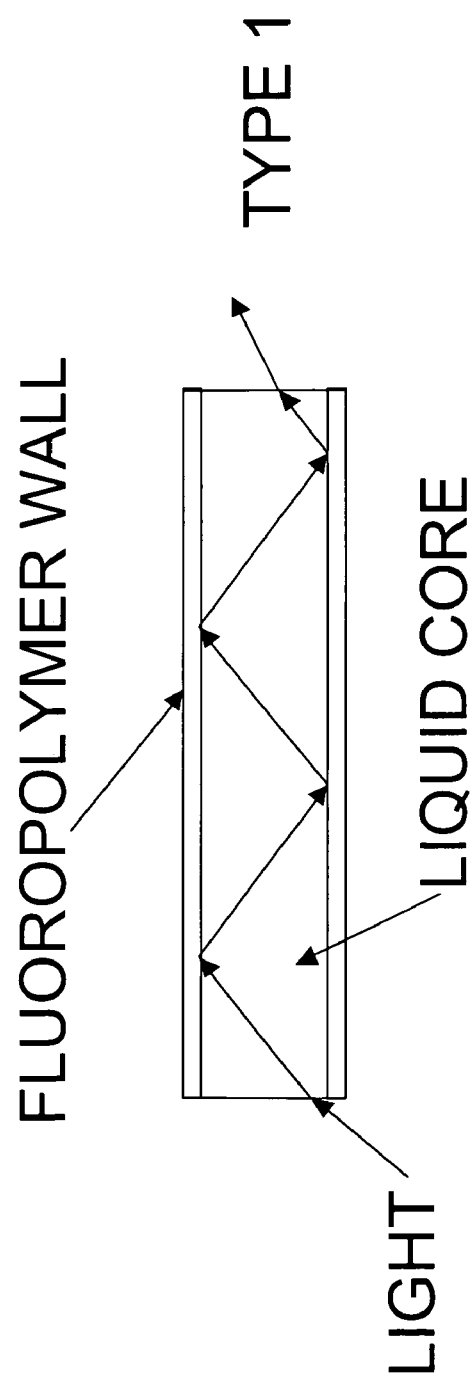
Fig. 1 TYPE 1
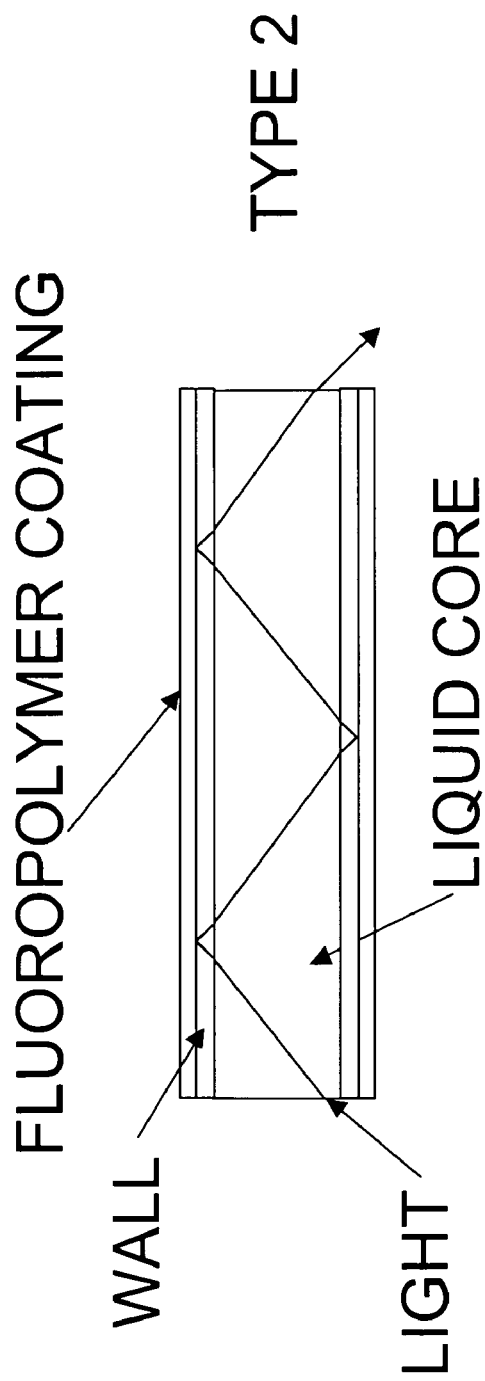
Fig. 2 TYPE 2

HIGH TEMPERATURE COATING TECHNIQUES FOR AMORPHOUS FLUOROPOLYMERS

CROSS-REFERENCE TO RELATED APPLICATION

This application claims the priority of U.S. Provisional Application No. 60/885,658 filed Jan. 19, 2007.

FIELD

The present invention relates generally to techniques for liquid coating fluoropolymer resins. One embodiment is more particularly concerned with new and improved techniques for liquid coating fluoropolymer resins having low solubility in fluorinated solvents to provide an increased coating thickness.

BACKGROUND

A range of optical flow cells, or so-called liquid core waveguides have been developed for optical spectroscopy applications in the ultraviolet, visible and infrared regions of the light spectra. Such flow cells are particularly suitable when combined with optical fibers for light transfer, enabling the design of a flexible sensor system. A number of flow cells having a long optical pathlength have been designed for absorbance, fluorescence and Raman spectroscopy. Similar to optical fibers, light is confined in such tubular flow cells within the (liquid) core by total internal reflection at the liquid core/wall interface or the liquid core/cladding (coating) interface. The liquid core typically comprises a sample solution. The refractive index of the cell wall or cladding must be lower than the refractive index of the liquid core.

Flow cells can generally be divided into two types (Type 1 and Type 2) on the basis of the light guiding effect and practical observations. In a Type 1 flow cell a polymer tubing works as cladding or wall of the flow cell containing the sample liquid (core) of the flow cell. In Type 1 flow cells the sample liquid (core) is in direct contact with the cladding. Thus the cladding must have a lower refractive index than the 1.33 refractive index of a typical water based sample solution. A Type 2 flow cell comprises a glass or polymer capillary tubing coated at the outside surface with a low refractive index polymer. The sample liquid (core) is contained within the capillary tubing. In Type 2 flow cells the capillary is a transparent high-refractive index layer separating the low refractive index cladding material from direct contact with the core fluid. Light is coupled into the liquid sample core and travels through the capillary wall, which does not interfere with the waveguide properties of the cell. The cladding must have a lower refractive index than e.g., the 1.33 refractive index of a water based sample solution.

For an optical coating used in a liquid core waveguide application, coating thicknesses must be a minimum of 5 times the highest optical wavelength used to ensure light guidance. The highest optical wavelength used can typically be 1000 nm, requiring an optical coating thickness equaling 5 micrometers or more. This becomes especially important when working with samples of different refractive indices, where the light guidance in the waveguide changes as a function of the refractive index.

Very thin optical coatings of about 3000 angstroms can be made by physical vapor deposition from bulk TEFLON AF. However, it is desirable to provide optical coatings without the need for expensive vapor deposition equipment. It is also desirable to provide optical coatings having a greater thickness than is typically available from vapor deposition.

The early development of waveguide sample cell technology was made difficult by the absence of a suitable cladding material, which possessed a refractive index lower than that of the water based sample solution (n=1.33), a most commonly used solvent. This problem was originally solved by Schwab et al and later by Tsunoda et al. who used a bar quartz capillary suspended in air. In these arrangements, light would be reflected at the outer air/glass interface. However, light transmission was found to be strongly dependent on the cleanliness of the external cell surface. Ambient dust and fingerprint contamination of the exterior cell surface could easily degrade light transmission and thus the reproducibility of the analytical measurements. Tiny cracks could develop at the external surface resulting in a brittle, easily broken capillary cell.

SUMMARY

Briefly, one aspect of the application is a coating technique that comprises preparing a liquid coating solution that is heated to a predetermined temperature above room temperature. The liquid coating solution is prepared by dissolving amorphous fluoropolymer resin in a heated solvent. The liquid, heated coating solution is applied to a substrate. Solvent is removed from the applied coating solution to form a coating of amorphous fluoropolymer resin on the substrate. The coating may optionally be subsequently thermally processed.

The increased solvent temperature allows the coating solution to have a significantly increased amorphous fluoropolymer resin concentration. However, the viscosity of the increased temperature coating solution remains sufficiently low so that the liquid, heated coating solution can be used with liquid coating processes such as spin coating. In one advantageous embodiment the amorphous fluoropolymer resin is TEFLON AF. In one especially advantageous embodiment the amorphous fluoropolymer resin is TEFLON AF 2400.

A better understanding of the invention will be obtained from the following detailed description of the presently preferred, albeit illustrative, embodiments of the invention.

BRIEF DESCRIPTION OF THE DRAWINGS

Referring now to the drawings wherein like elements are numbered alike in the several Figures:

FIG. 1 is a schematic illustration of a Type 1 liquid core waveguide which has an amorphous fluoropolymer wall; and FIG. 2 is a schematic illustration of a Type 2 liquid core waveguide which has an amorphous fluoropolymer coating.

DETAILED DESCRIPTION

A technique for coating amorphous fluoropolymers has particular application for substrates of liquid core waveguides which employ an aqueous sample fluid. Such liquid core waveguides have numerous spectrouscopic applications in all ranges of the light spectrum. The technique may also be employed for other structures and applications.

A desirable feature of amorphous fluoropolymers is their optical transparency in the ultraviolet (UV), visible (VIS) and near infrared (NIR) part of the light spectrum due to their amorphous structure (there are no crystallites to scatter light). Further, the nanometer sized voids in the amorphous fluoropolymer structure (a consequence of the ring shapes in the polymer chains) result in refractive indices that are typically less than about 1.34. For example, a copolymer of tetrafluoroethylene with perfluoro-2,2-dimethyl-1,3-dioxole, is sold by E.I. DuPont de Nemours and Company, Wilmington, Del., under the Registered Trade Mark "TEFLON AF". TEFLON AF is sold in various grades designated by a number after the name. TEFLON AF 1600 has a refractive index of about 1.31. TEFLON AF 2400 has a refractive index of about 1.29. The Asahi Glass Co., Ltd., offers an amorphous fluorocarbon polymer sold under the trademark "CYTOP" having a refractive index of 1.34. Solvay Solexis offers a semi-crystalline perfluoropolymer, Hyflon. All of these materials have a refractive index between about 1.29 and about 1.35. All of these materials are chemically very inert. All of these materials are transparent within the 200 nm to 2000 nm spectral range.

Use of TEFLON AF creates a number of useful opportunities in the development of flow cells with a long optical pathlength. Fluoropolymers from Asahi and/or Solvay might also be useful based on their refractive index and properties. However, TEFLON AF has an even lower refractive index that provides better performance in a liquid waveguide with an aqueous sample fluid.

Amorphous fluoropolymers can be processed in several different ways. They are thermoplastic, in particular, TEFLON AF 1600 and TEFLON AF 2400 have a melting point range of about 240° C. to about 275° C. and about 340° C. to about 360° C. respectively. Thus, amorphous fluoropolymers can be thermally processed such as by compression molding, injection molding or extruding. Such thermal processes are useful to produce shapes such as rods, tubes, bars and sheets of various thicknesses. While thermal processing can be used to make tubes of substantial (by coating standards) wall thicknesses, thermal processing of amorphous fluoropolymer resins is not commercially useful to make optical coatings. For example, at the current approximate cost of $100/g of TEFLON AF such solid amorphous resin tubes are commercially impracticable. It is highly desirable to minimize the usage of the material to an absolute minimum. A coating of 5-10 micrometers thickness is far more economical than extruded tubing with a wall thickness of 60 to 120 micrometers.

The outside surface of a glass or fused silica capillary cell can be coated with TEFLON AF producing a similar effect to that described by Tsunoda et al. The advantage of this configuration is that the total reflection would occur at the fused silica wall/TEFLON AF interface (Type 2) and contamination of the TEFLON AF cell cladding exterior surface could not alter the waveguide properties of Type 2 cells. Moreover, the fused silica tubing used in the Type 2 liquid waveguide capillary cells (LWCCs) acts like a backbone, providing physical stability to the cell with the TEFLON AF coating protecting its external surface from mechanical crack formation. The tubing could be made with a very thin wall and spooled if desired. The hydrophilic surface of the inner silica capillary reduces internal air bubble formation, which may be a problem with small diameter Type 1 cells, where the hydrophobic TEFLON AF tends to trap air bubbles at the inner cell wall. Surface roughness is a key factor in the structure of the waveguide. It can be safely assumed that the roughness of the inner and outer surface of the fused silica capillary is lower than that of a post-cured TEFLON AF tubing or inner coating. A smoother surface is desirable because it results in lower light scattering and better light throughput.

Amorphous fluoropolymer resins can be dissolved to a limited extent and with great difficulty in fluorinated solvents to prepare a coating solution that can be used in liquid coating processes such as spin-coating, dip-coating and potting. Such solvent includes the Fluorinert® line of fluorinated solvents, FC-71, FC-75, FC-40, FC-70, FC-77 and FC-84, all from the 3M Company. Other fluorinated solvents include Vertrel® XF or Freon TF from DuPont Wilmington, Del., the fluorinated polyethers HT70, HT85, HT90, HT100, HT110, HT135, HT200, HT230, HT250 and HT270 and the perfluorinated polyethers sold as Galsden, all from Ausimont USA, Inc. One distinguishing factor of the solvents is their boiling point. Higher boiling point solvents, such as FC70 form coatings requiring more energy to dry than solvents with a lower boiling point, such as FC75. Typically, such increased energy requirements are commercially disadvantageous.

DuPont offers TEFLON AF 1600 and TEFLON AF 2400 as powdered resins. TEFLON AF 1600 can be dissolved in room temperature FC75 solvent to achieve coating solution concentrations of about 6% up to about 18% at viscosities of about 80 cP up to about 4800 cP respectively. TEFLON AF 2400 is much more desirable coating material due to its lower refractive index of 1.29. However, TEFLON AF 2400 can only practically be dissolved to a coating solution concentration of 1% in room temperature FC75. At concentrations equal to or greater than 2% TEFLON AF 2400 in room temperature FC75, the solution becomes very viscous (>5000 cP). Above this level the TEFLON AF 2400 will either not dissolve or become a gel after many hours or days. Using dip-coating techniques to process a 1% TEFLON AF2400 coating solution, an optical coating thickness in the 0.5 to 1 micrometer range can be achieved. TEFLON AF 2400 coatings having a thickness greater than about 1 micrometer are not commercially practicable using this method due to the limited solids content available in coating solutions having a viscosity suitable for use in this method. Thus, TEFLON AF 2400 coatings greater than about 1 micrometer are not practically achievable from liquid coating processes. However, for an optical coating used in a liquid core waveguide application, a coating thickness of about 5 micrometers or more (a minimum of 5 times the highest optical wavelength used) is required to ensure light guidance. Thus, a liquid coating technique that can provide fluoropolymer coatings having increased thicknesses as compared to those presently available is desirable.

The techniques discussed herein are believed applicable to any amorphous fluoropolymer. Typically, the disclosed coating techniques have applications including semiconductor photomask pellicles, microelectronic etch masks, optical and anti-reflective coatings, chemically protective coatings, gas permeable membranes, hydrophobic coating compositions, dielectrics and optical waveguide claddings and liquid core waveguides. For simplicity, and without limiting the scope of the present application, the coating techniques will generally be described with reference to TEFLON AF 2400 as used in a liquid core waveguide cladding unless otherwise indicated.

The coating technique comprises preparing a liquid coating solution by adding amorphous fluoropolymer into an appropriate solvent and raising the mixture to a temperature elevated above room temperature. Heating the solvent increases the amount of amorphous fluoropolymer that can be dissolved. In some embodiments the liquid, heated coating solution allows an increase of amorphous fluoropolymer resin concentration in solution of threefold as compared to the concentration of that same resin in the same solvent at room temperature.

The liquid, heated coating solution is applied at an elevated working temperature to a substrate. The substrate may also be at a temperature elevated above room temperature. Solvent is removed from the applied coating solution to form a coating on the substrate.

Typical amorphous fluoropolymer resins useful in the coating solution include, for example, TEFLON AF available from DuPont; CYTOP available from the Asahi Glass Co., Ltd.; and Hyflon available from Solvay Solexis. For liquid core waveguides a coating with lowest possible refractive index and highest possible transmission of light in the UV, VIS and NIR is desired. Such a coating can be fabricated with amorphous fluoropolymers such as, for example, the TEFLON AF series manufactured by the DuPont Company.

Typical solvents useful in the coating solution include fluorinated solvents such as, for example, the Fluorinert® line of fluorinated solvents available from the 3M Company; Vertrel® XF or Freon TF available from DuPont; the fluorinated polyethers and the perfluorinated polyethers available from Ausimont USA, Inc. Advantageously, a fluorinated solvent with a high boiling point is selected. To avoid solvent evaporation during the coating process, the working temperature of the liquid, heated coating solution is maintained significantly below the solvent boiling point. Generally, higher fluoropolymer concentrations will require higher temperatures. Preferably, the working temperature is kept about 10% to about 15% below the difference of solvent boiling temperature and room temperature.

Other factors for the working temperature of the liquid, heated coating solution are glass transition temperature of the amorphous fluoropolymer resin and more importantly melting temperature and decomposition temperature of the amorphous fluoropolymer resin. To avoid material flow during the coating process, a working temperature below the typical melting temperature of the chosen amorphous fluoropolymer (TEFLON AF 1600: 240° C.-275° C., TEFLON AF 2400: 340° C.-360° C.) is advantageously used as the upper working limit.

In one embodiment the coating technique comprises:

Selecting an amorphous fluoropolymer resin.

Selecting a solvent that will dissolve the selected amorphous fluoropolymer resin.

Adding amorphous fluoropolymer resin to the solvent.

Heating the solvent-fluoropolymer resin combination to a predetermined temperature.

Dissolving the amorphous fluoropolymer resin in the heated solvent to form a heated, liquid coating solution.

Heating the liquid coating solution to a working temperature. The heated, liquid coating solution will have a viscosity suitable for liquid coating application processes. Advantageously, the heated, liquid coating solution will have a viscosity less than about 5,000 cP.

Applying the heated, liquid coating solution to a substrate.

Cooling the coated substrate.

Removing solvent from the applied liquid coating solution to form an amorphous fluoropolymer coating on the substrate.

Optionally, heating the coated substrate to a temperature above the glass transition temperature and below the melting point range of the selected amorphous fluoropolymer resin.

In one embodiment a preferred solvent is FC70 having a boiling temperature of 215° C., resulting in a working temperature of 185° C. In this embodiment 8% (weight) of TEFLON AF is added to the FC70 solvent and the combination is heated to 185° C. To avoid evaporation, the container holding the heated solvent-fluoropolymer resin combination is advantageously sealed when not in use. After the fluoropolymer resin is dissolved, the solution can be heated to the working temperature used for coating. The working temperature should not be lowered to avoid supersaturation of the liquid, heated coating solution and the resulting significant increase in viscosity. To minimize evaporation, coating at the working temperature is preferably performed in a closed environment. Two useful methods for applying the heated coating solution to a substrate are dipcoating and continuous coating.

Dipcoating:

In one embodiment of a dipcoating method the substrate is a piece of capillary of a desired length. The capillary is carefully cleaned in a dust-free environment. The cleaned capillary is dipped into a container holding the coating solution at a temperature of 165 to 185° C. Advantageous resins for the coating solution are TEFLON AF 2400 or TEFLON AF 1600. An advantageous solvent for the coating solution is FC70. The coated capillary is withdrawn from the heated coating solution at a controlled speed. A withdrawal speed of about 2-4 seconds/10 cm is useful.

The coated substrate is heated to a temperature about 2-3% below the solvent boiling temperature. This heating step efficiently removes (dries out) solvent from the coating. Holding the temperature about 2-3% below the solvent boiling temperature is advantageous to avoid boiling of the solvent in the liquid coating and generation of coating inconsistencies due to bubble formation during solvent evaporation.

The heated substrate is optionally moved to a second heating station where the coating is heated to a temperature above the glass transition temperature and below the melting point range of the selected amorphous fluoropolymer resin. The second heating station advantageously removes any solvent residue from the coating, results in stress release, provides a smoother coating surface and provides better polymer adherence to the substrate surface. To avoid melting and gravity based movement or flow of the coating, the second heating station should be run significantly (about 15%) below the melting point range of the fluoropolymer in the coating. For example, for a coating comprising TEFLON AF 2400 (mp range about 340° C.) the second station heating temperature would be about 290° C.

Continuous Coating:

A long substrate such as a capillary is continuously moved through a bath of coating solution at a suitably elevated temperature. An advantageous resin for the coating solution is TEFLON AF 2400. An advantageous solvent for the coating solution is FC70. An advantageous temperature for the coating solution is 185° C.

The coated substrate is continuously moved through a first heating device such as an oven to heat the coated substrate to a temperature about 2-3% below the solvent boiling temperature. This first heating step efficiently removes (dries out) solvent from the coating. Holding the temperature about 2-3% below the solvent boiling temperature is advantageous to avoid boiling of the solvent in the liquid coating and generation of coating inconsistencies due to bubble formation during solvent evaporation.

The heated substrate is optionally continuously moved through a second heating device such as an oven to heat the coated substrate to a temperature above the glass transition temperature and below the melting point range of the selected amorphous fluoropolymer resin. The second heating step advantageously helps to remove any solvent residue from the coating, results in stress release, provides a smoother coating surface and provides better polymer adherence to the substrate surface. To avoid melting and gravity based movement or flow of the coating, the second heating device should be run significantly (about 15%) below the melting point range of the fluoropolymer in the coating. For example, for a coating comprising TEFLON AF 2400 (mp range about 340° C.) the second station heating temperature would be about 290° C.

Naturally, the speed of the substrate through the bath and oven(s) will be chosen to achieve a desired coating thickness and solvent drying.

In one prophetic embodiment the coating technique may be directed to the manufacturing of liquid core waveguides used in HPLC, FIA, Raman spectroscopy and other flow cell applications. The waveguide tubing may be comprised of materials as diverse as metal, glass, polymers (e.g. PTFE). In this embodiment the inside and/or outside of this tubing may be coated with low solubility fluoropolymers, such as, for example, TEFLON AF2400 to achieve a coating thickness of several micrometers. Such thicknesses are not achievable using traditional liquid coating and curing techniques usually performed at room temperature.

In one prophetic embodiment the coating technique may be used to manufacture a cladding over a core material and thereby provide high NA optical fibers. A high refractive index polymer, glass or silica may be used as the core material. In this embodiment the glass or polymer fiber core may be coated with an amorphous fluoropolymer. The numerical aperture and therefore the ability of a fiber to accept light as a function of the input angle is dependent on the refractive index of the core and cladding. Especially for fibers used to transmit light in the UV and VIS spectrum a very advantageous material combination is believed to be fused silica as a core material and TEFLON AF as the exterior cladding material. Conventionally, such optical fibers are only made with TEFLON AF 1600. TEFLON AF 2400 is not generally used because of its low solubility in the conventional room temperature coating solutions. The presently disclosed coating technique may allow the coating of optical fibers with TEFLON AF 2400. Optical fibers coated with TEFLON AF 2400 using the disclosed technique should have an increased ability to accept light with a higher numerical aperture. Further, TEFLON AF 2400 has a high glass transition temperature, a lower refractive index and a higher hardness, making this material more suitable for exterior coatings than TEFLON AF 1600.

In other embodiments the coating technique may be applied to other applications, such as semiconductor photomask pellicles, microelectronic etch masks, optical and antireflective coatings, chemically protective coatings, gas permeable membranes hydrophobic coating compositions, dielectrics or optical fibers with ultra high numerical apertures. In these embodiments TEFLON AF may be used either as cladding or as both core and cladding materials. Advantageously, TEFLON AF 1600 may be used as a core and TEFLON AF 2400 may be used as a cladding.

Within the field of HPLC sample cells, it is known that several solvents commonly used, attack the TEFLON AF cladding layer of the fluid core waveguide. For example, Acetonitrile has a tendency to induce swelling and degradation of the coating surface, resulting in a degradation of its optical properties. Further, due to the high permeability of TEFLON AF, solvents can diffuse into the TEFLON AF layer and generate swelling. These solvents may later slowly out-diffuse, generating a diffusion-tail seen as an absorbance baseline instability.

Another embodiment directed to the manufacturing of flow cells envisions a waveguide made of a glass capillary tubing with an outside coating of TEFLON AF. The outside coating of TEFLON AF may be chemically isolated by overcoating with a low melting point temperature TEFLON resin such as TEFZEL (DuPont) or by shrinking e.g. a low temperature shrink tubing, such as FEP (DuPont) over the coating. In this flow cell light reflection occurs at the internal capillary tubing/TEFLON AF interface and is not affected by the outer protection layer. The FEP or Tefzel overcoating layer would work as both a protection layer against physical damage (e.g. scratching) and as a chemical protective coating when the waveguide is in contact with solvents that might attack the TEFLON AF layer and modify its optical characteristics.

In general, unless otherwise explicitly stated the disclosed materials may be alternately formulated to comprise, consist of, or consist essentially of, any appropriate components or moieties herein disclosed. The disclosed materials may additionally, or alternatively, be formulated so as to be devoid, or substantially free, of any components, materials, ingredients, adjuvants, moieties or species used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed:

1. A coating technique, comprising the steps of:
   selecting an amorphous fluoropolymer resin;
   selecting a solvent that will dissolve the selected amorphous fluoropolymer resin;
   adding the amorphous fluoropolymer resin to the solvent;
   heating the resin and solvent mixture to a temperature above room temperature;
   dissolving the selected amorphous fluoropolymer resin in the heated solvent to form a heated, liquid coating solution having a viscosity less than about 5,000 cP;
   applying the heated, liquid coating solution to a substrate;
   removing solvent from the applied liquid coating solution to form an amorphous fluoropolymer coating on the substrate; and
   heating the coated substrate to a temperature above a glass transition temperature of the selected amorphous fluoropolymer resin.

2. The technique of claim 1 wherein the step of removing solvent from the applied liquid coating solution is done at a temperature about two percent to about three percent below a boiling temperature of the selected solvent.

3. The technique of claim 1 wherein heated, liquid coating solution is maintained at a working temperature that will prevent supersaturation of the solution while applying the heated, liquid coating solution to a substrate.

4. The technique of claim 1 wherein heated, liquid coating solution is maintained at a working temperature below a melting point of the selected amorphous fluoropolymer resin while applying the heated, liquid coating solution to a substrate.

5. The technique of claim 1 wherein heated, liquid coating solution is maintained at a working temperature about 15% below the difference of a boiling temperature of the selected solvent and room temperature while applying the heated, liquid coating solution to a substrate.

6. The technique of claim 1 wherein the amount of amorphous fluoropolymer resin dissolved in solvent at the temperature above room temperature is greater than the amount of amorphous fluoropolymer resin that can be dissolved in that solvent at room temperature.

7. The technique of claim 1 wherein the amorphous fluoropolymer resin is selected from TEFLON AF 1600 or TEFLON AF 2400 powdered amorphous polytetrafluoroethylene and the solvent is selected from FLUORINERT FC70 or FLUORINERT FC75 fluorinated liquid.

8. The technique of claim 1 wherein the substrate is a component of a waveguide.

9. The technique of claim 1 wherein the substrate is a glass tube of a liquid core waveguide.

* * * * *